United States Patent
Ah-Pine et al.

(10) Patent No.: US 8,171,049 B2
(45) Date of Patent: May 1, 2012

(54) SYSTEM AND METHOD FOR INFORMATION SEEKING IN A MULTIMEDIA COLLECTION

(75) Inventors: Julien Ah-Pine, La Tronche (FR); Jean-Michel Renders, Quaix-en-Chartreuse (FR); Marie-Luce Viaud, Paris (FR)

(73) Assignee: Xerox Corporation, Norwalk, CT (US)

( * ) Notice: Subject to any disclaimer, the term of this patent is extended or adjusted under 35 U.S.C. 154(b) by 216 days.

(21) Appl. No.: 12/710,783

(22) Filed: Feb. 23, 2010

(65) Prior Publication Data
US 2011/0072012 A1    Mar. 24, 2011

Related U.S. Application Data

(60) Provisional application No. 61/243,780, filed on Sep. 18, 2009.

(51) Int. Cl.
G06F 7/00 (2006.01)
G06F 17/30 (2006.01)

(52) U.S. Cl. ......... 707/772; 707/723; 707/736; 707/766
(58) Field of Classification Search .......... 707/723, 707/736, 766, 772
See application file for complete search history.

(56) References Cited

U.S. PATENT DOCUMENTS

| | | | |
|---|---|---|---|
| 6,728,752 B1 * | 4/2004 | Chen et al. ................. | 709/203 |
| 7,099,860 B1 | 8/2006 | Liu et al. | |
| 7,627,556 B2 * | 12/2009 | Liu et al. ................. | 1/1 |
| 2008/0249999 A1 | 10/2008 | Renders et al. | |
| 2009/0252404 A1 | 10/2009 | Lecerf | |

OTHER PUBLICATIONS

U.S. Appl. No. 12/233,135, filed Sep. 18, 2008, Clinchant et al.
U.S. Appl. No. 12/233,978, filed Sep. 19, 2008, Clinchant et al.
U.S. Appl. No. 12/364,885, filed Feb. 3, 2009, Lecerf et al.
U.S. Appl. No. 12/479,972, filed Jun. 8, 2009, Privault et al.
Ah-Pine, et al., Crossing Textual and Visual Content in Different Application Scenarios, *Multimedia Tools Appl.*, 42(1) 31-56 (2009).
Ah-Pine, et al., XRCE's Participation to ImageCLEF 2008, In *Working Notes of CLEF'08 Workshop*, 2008.
Bruno, et al., Design of Multimodal Dissimilarity Spaces for Retrieval of Video Documents, *IEEE Trans. Pattern Anal. Mach. Intell.*, 30:1520-1533 (2008).
Campbell, et al., The Ostensive Model of Developing Information Needs, In *Proc. of CoLIS* 2, pp. 251-268 (1996).
Chen, A Survey of Indexing and Retrieval of Multimodal Documents: Text and Images, *Technical Report 2006-505*, Queen's University, School of Computing (2006).

(Continued)

*Primary Examiner* — Charles Lu
(74) *Attorney, Agent, or Firm* — Fay Sharpe LLP

(57) ABSTRACT

An apparatus and method facilitate combined query based searching with serendipitous browsing in a multimedia collection. A user selects objects to label from a local map, which may include representations of objects retrieved from the collection as being responsive to a text or image base query. The text and image portions of the object can be independently labeled. Unlabeled objects are scored and ranked based on the applied labels of labeled objects, which may take into account cross-media pseudo-relevance and user selectable (or default) parameters, such as a forgetting factor, which tends to place greater weight on more recently labeled objects, and a modality parameter, which laces greater weight on the modality (text, image, or hybrid) currently selected by the user. The local map is modified, based on the ranking, optionally after reranking of objects to improve the diversity of the displayed objects.

25 Claims, 5 Drawing Sheets

OTHER PUBLICATIONS

Chen, et al., Multi-Modal Browsing of Images in Web Documents, *Proceedings of SPIE Document Recognition and Retrieval VI*, vol. 3651, pp. 122-133, 1999.

Clinchant, et al., XRCE's Participation to ImageCLEFphoto 2007, In *Working Notes of CLEF'07 Workshop*, 2007.

Deselaers, et al., Learning Weighted Distances for Relevance Feedback in Image Retrieval, In *Proc. of ICPR'08*, 2008.

Fruchterman, et al., Graph Drawing by Force-Directed Placement, *Softw, Pract Exper.*, 21:1129-1164, 1991.

*State of the Art on Advanced Visualization Methods*, Report D7.2 of the Vitalas EC Project FP6-045389 (2007).

Huang, et al., Active Learning for Interactive Multimedia Retrieval, *Proc. of the IEEE*, 96:648-667, 2008.

Huart, et al., Evaluation of Multimedia Applications Using Inspection Methods: The Cognitive Walkthrough Case, *Interacting with Computers*, 16(2) (2004).

Jeon, et al., Automatic Image Annotation and Retrieval Using Cross-Media Relevance Models, In *ACM SIGIR*, 2003.

Lu, et al., Joint Semantics and Feature Based Image Retrieval Using Relevance Feedback, *IEEE Transactions on Multimedia*, 5:339-347, 2003.

Maillot, et al., IPAL Inter-Media Pseudo-Relevance Feedback Approach to ImageCLEF 2006 Photo Retrieval, In *Working Notes of CLEF'06 Workshop*, 2006.

Marchionini, Exploratory Search: From Finding to Understanding, *Communications of the ACM*, 49:41-46 (2006).

Misue, et al., Layout Adjustment and the Mental Map, *Journal of Visual Languages & Computing*, 6:183-210 (1995).

Nguyen, et al., Interactive Access to Large Image Collections Using Similarity-Based Visualization, *J. Vis. Lang. Comput.*, 19(2):203-224 (2008).

Nguyen, et al., Similarity Learning via Dissimilarity Space in CBIR. In *Proc. of MIR'06*, pp. 107-116, ACM, 2006.

Noack, Visual Clustering of Graphs with Non-Uniform Degrees, In *Proc. of Int. Symp. on GraphDrawing (GD'05)*, pp. 309-320, Springer-Verlag (2005).

Polson, et al., Cognitive Walkthrouqhs: A Method for Theory-Based Evaluation of User Interfaces, *Int. J. Man-Mach. Stud.*, 36(5) 741-773 (May 1992).

Rahman, et al., Multi-Modal Interactive Approach to ImageCLEF 2007 Photographic and Medical Retrieval Tasks by CINDI, In *Working Notes of CLEF'07 Workshop*, 2007.

Rocchio, Relevance Feedback in Information Retrieval, In *The SMART Retrieval System*, G. Salton, (Ed.), Chapter 14, pp. 313-323, 1971.

Urban, et al., An Adaptive Technique for Content-Based Image Retrieval, *Multimedia Tools and Appl.*, 31(1) 1-28 (2006).

\* cited by examiner

SYSTEM AND METHOD FOR INFORMATION SEEKING IN A MULTIMEDIA COLLECTION

This application claims the benefit of U.S. Provisional Application Ser. No. 61/243,780, filed Sep. 18, 2009, entitled SYSTEM AND METHOD FOR INFORMATION SEEKING IN A MULTIMEDIA COLLECTION, by Julien Ah-Pine, et al., the disclosure of which is incorporated herein by reference in its entirety.

CROSS REFERENCE TO RELATED PATENTS AND APPLICATIONS

The following co-pending applications, the disclosures of which are incorporated herein by reference in their entireties, are mentioned:

U.S. application Ser. No. 12/080,414, filed Apr. 2, 2008, entitled MODEL UNCERTAINTY VISUALIZATION FOR ACTIVE LEARNING, by Loïc Lecerf;

U.S. application Ser. No. 12/364,885, filed Feb. 3, 2009, entitled ADAPTIVE GRAND TOUR, by Loïc Lecerf, et al.;

U.S. application Ser. No. 12/479,972, filed Jun. 8, 2009, entitled SYSTEM AND METHOD FOR ASSISTED DOCUMENT REVIEW, by Caroline Privault, et al.;

U.S. application Ser. No. 12/233,135 filed Sep. 18, 2008, entitled QUERY TRANSLATION THROUGH DICTIONARY ADAPTATION, by Stephane Clinchant and Jean-Michel Renders; and U.S. application Ser. No. 12/233,978, filed Sep. 19, 2008, entitled CROSS-MEDIA SIMILARITY MEASURES THROUGH TRANS-MEDIA PSEUDO-RELEVANCE FEEDBACK AND DOCUMENT RE-RANKING, by Stephane Clinchant and Jean-Michel Renders.

BACKGROUND

The exemplary embodiment relates to the information seeking field. It finds particular application in connection with serendipitous browsing combined with query-based searching in multimedia collections and will be described with particular reference thereto.

Information retrieval systems provide a user-friendly interface by which a user can retrieve documents from a database that are relevant to or match a query. Typically, an information retrieval system ranks a "top N" documents that best match the query. An example of such a system is an Internet search engine.

Many information retrieval systems are text-based. That is, the information retrieval system receives a textual query and searches textual content of documents for similarities with the textual query, such as the same or similar words or terms, common semantic content (based, for example, on derivation of semantically related words determined using an on-line thesaurus), and the like. In a more complex approach, language models may be developed to represent the query and documents to be searched, and the information retrieval is based on similarity of query and document language models.

Digital information repositories enable storage and processing of information in different media types or "modalities," such as text, images (single images or video), audio, and the like. It is not unusual for a single document (or, more generally, an "object") to include content of two or more different media types or modalities. In view of this, there is interest in information retrieval systems that are capable of retrieving documents based on non-textual (visual) content. Similarity between images, for example, may be based on extracted features that are expected to have semantic significance, that is, to be discriminative of the subject matter depicted in the image. Extracted features may be based on color, shape, face recognition techniques, and the like. An information retrieval system can then use a similarity measure between a query image and stored images to retrieve a subset of the stored images which may be responsive to a user's query.

Systems have also been developed which consider one or both of text similarity and image similarity in querying multimedia collections. For example, pseudo-relevance feedback may be used. In this approach, text content of multimedia documents which have been retrieved in response to an image based query may be used to enrich the query for retrieving additional documents. Trans-media similarity methods are disclosed, for example, in S. Clinchant, J.-M. Renders, and G. Csurka, "XRCE's Participation to ImageCLEF 2007," in *Working Notes of CLEF'07 Workshop* (2007); and in J. Ah-Pine, C. Cifarelli, S. Clinchant, G. Csurka, and J. Renders, "XRCE's Participation to ImageCLEF 2008," in *Working Notes of CLEF'08 Workshop* (2008).

Information seeking differs from the more standard information retrieval techniques in that it does not rely solely on a query to a search engine. While information retrieval is useful for finding an answer to a specific question, such the date of birth of a particular famous person, information seeking is frequently directed more generally towards a topic, such as seeking events in the life of the famous person. Various strategies have been developed for accessing and exploring multimedia databases, in order to acquire and discover knowledge through information seeking. One strategy is browsing and navigation: the aim is to browse a large digital library in order to have a general overview of the different themes and the underlying structure using a tool that groups together similar objects and visualizes the similarity relations between them. The user can then explore these clusters, by zooming into particular areas, visiting specific documents and jumping to their neighbors. Another strategy is query-based searching: the aim is to find relevant objects with respect to a given query quickly using a tool that takes into account the user feedback to bridge the semantic gap between the user's query and the multimedia objects. In this case, visualizing the similarity relationships between the retrieved objects allow the user to have a more rapid understanding of the different topics and sub-topics.

A more general "mixed-strategy" approach occurs when the user wants to have a mix between serendipitous searching and query-based searching. This is often because it is hard for the user to formulate an unambiguous query, which is the direct translation of the user's information needs. It may also be the case that the user does not know exactly for what he or she is looking. It would thus be advantageous for the user to engage in a discovery process, where the user could incrementally specify more precisely the user's requirements depending on what the system is able to propose as responsive objects and for this to occur interactively, where the user could understand the direction currently being investigated with respect to the global picture, and where the user can go back to explore new directions, being aware of the boundaries of this discovery process.

INCORPORATION BY REFERENCE

The following references, the disclosures of which are incorporated herein by reference in their entireties, are mentioned:

U.S. Pat. No. 7,099,860, issued Aug. 29, 2006, entitled IMAGE RETRIEVAL SYSTEMS AND METHODS WITH SEMANTIC AND FEATURE BASED RELEVANCE FEEDBACK, by Wen-Yin Liu, et al., discloses an image retrieval system which performs both keyword-based and content-based image retrieval. A user interface allows a user to specify queries using a combination of keywords and example images.

U.S. Pub. No. 2008/0249999, published Oct. 9, 2008, entitled INTERACTIVE CLEANING FOR AUTOMATIC DOCUMENT CLUSTERING AND CATEGORIZATION, by Jean-Michel Renders, et al., discloses a method in which documents are clustered or categorized to generate a model associating documents with classes. Outlier measures are computed for the documents indicative of how well each document fits into the model. If an outlier document is annotated with a label class, a possible corrective label class is identified if the annotated document has higher similarity with the possible corrective label class under the model than with the annotated label class.

BRIEF DESCRIPTION

In accordance with one aspect of the exemplary embodiment, a computer-implemented method for information seeking in a multimedia collection of objects is provided. The method includes providing for a user, through a graphical user interface, to select a subset of objects from a multimedia collection. At least some of the objects in the collection include first and second modalities. Representations of objects in the subset are displayed on a local map. At each of a plurality of iterations the method includes: a) providing for the user to annotate a modality of an object represented in the local map with a relevance label, whereby an object's first modality and second modality are able to be labeled independently, b) optionally, providing for the user to select at least one of the first and second modalities, c) optionally, providing for the user to select a forgetting factor for at least one of the first and second modalities, d) optionally, providing for the user to select a locality factor for at least one annotated object, e) computing relevance scores for unlabeled objects in the collection, each relevance score taking into account labels applied to other objects, computed similarity measures between the unlabeled object and the other objects in the collection, and optionally, at least one of i) the user selected at least one modality, ii) the locality factor, and iii) the forgetting factor, the forgetting factor affecting a weight applied to at least some of the labeled objects based on the iteration in which the label was applied, f) modifying the local map based on the computed relevance scores, and g) displaying the modified local map on a visual display.

In accordance with another aspect, an apparatus for information seeking in a multimedia collection of objects includes memory which stores a multimedia collection of objects, at least some of the objects in the collection comprising first and second modalities, and similarity matrices for the objects in the collection for the first and second modalities. A graphical user interface is configured for displaying a global map and a local map of objects in the multimedia collection, the local map including representations of a subset of objects in the multimedia collection. The graphical user interface is configured for inputting parameters for relevance scoring selected from a modality parameter, a locality parameter, and a forgetting factor, and for inputting relevance labels for objects, whereby an object's first modality and second modality are able to be labeled independently. A ranking component computes relevance scores for unlabeled objects in the collection based on labels applied to other objects, the selected parameters, and the similarity matrices. A graph layout component is provided for modifying the local map based on the computed relevance scores.

In accordance with another aspect, a method which allows serendipitous browsing and query based search of a multimedia collection is provided. The method includes storing a multimedia collection of objects in computer-readable memory, storing similarity matrices for text portions and image portions of the objects in the collection in computer-readable memory, receiving an input user query selected from a text query, an image query, and a combination thereof, retrieving a subset of the objects in the collection, based on the user query, and displaying representations of the retrieved objects in the subset in a two-dimensional local map on a display. The method further includes providing access to an underlying object of a user-selected object representation displayed in the local map, providing for the user to label at least one of the text part and the image part of the selected object with a relevance label, whereby the image part and text part of a multimedia object are able to be independently labeled with different relevance labels, computing relevance scores for unlabeled objects in the collection, each relevance score being a function of user-applied relevance labels to other objects in the collection and respective similarity measures retrieved from the similarity matrices, optionally reranking the relevance scores to increase diversity, and modifying the local map based on the optionally reranked relevance scores.

DETAILED DESCRIPTION

Figure 1:
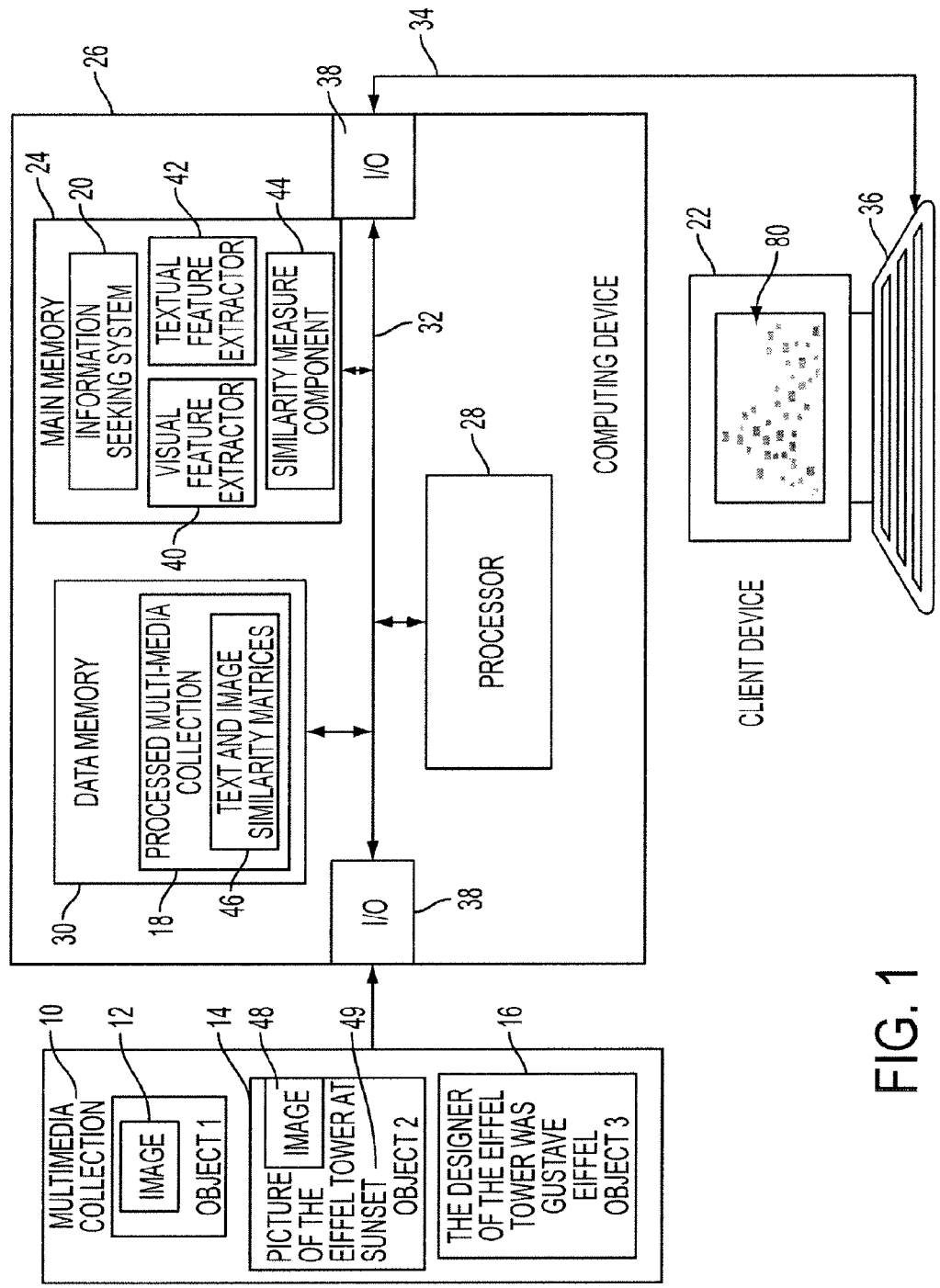
FIG. 1 is a functional block diagram of an apparatus for interactive searching of a multimedia collection in accordance with one aspect of the exemplary embodiment.

Aspects of the exemplary embodiment relate to an interactive apparatus embodying a system for information seeking in a multi-modal collection of objects, and to a method and computer program product for information seeking in a multi-modal collection of objects.

An "object" is used herein to mean an electronic (e.g., digital) recording of information. In its electronic form, an object may include different modalities, such as text content, image data, audio data, or a combination thereof. Text content may be computer generated from a predefined character set and can be extracted, for example, by optical character recognition (OCR) or the like. Image data may include graphics, photographs, video content, or the like and may be stored as bitmaps such as PDF, TIFF, JPEG files or the like. In the case of video content, the image data can be stored as embedded video content or as linked files, for example linked *.mov, *.mpg, *.rm, or *.mp4 files. Audio content can be stored as embedded audio content or as linked files, for example linked *.wav, *.mp3, or *.ogg files. Other media modalities are also contemplated, such as graphical animation content, computer-aided design (CAD) content, and the like. A multimedia object includes content selected from two or more media types (modalities). In the illustrative embodiments set forth herein, the modalities include text content and image content.

A "multimedia collection" refers to one or more information sources or digital libraries that contain multimedia objects and may also be referred to as a database. In the exemplary embodiment, each object in the collection includes text and/or image content and at least some or all the objects include both text and image content (hybrid objects). For example, an image and a caption or short paragraph describing the image may form a single object. In a multimedia object, the text may be linked to the image, e.g., as metadata, HTML file, or the like. As another example, a multimedia document may be stored as a single file containing both text and embedded images. The exemplary method and system may be extended to other modes (such as speech, music, and the like), by defining adequate monomodal similarity measures for these modalities.

A "session" is a sequence of interactions between a user and the system that correspond to the same information need (i.e., the same task). These interactions include visualizations and proposals from the system side and query formulation and/or object selection and/or relevance feedback from the user side.

In one aspect, a multimedia information seeking apparatus is provided that couples both serendipitous browsing and query-based search in a flexible and smooth way. The architecture of the exemplary apparatus and system it hosts offer a double perspective on the task by providing a global view and a local view of the collection, the two views being consistent and linked. This allows the user to navigate in the multimodality database, to understand its underlying structure and boundaries, and to control better the discovery process.

In another aspect, a method is provided that allows the user to perform contextual searching by introducing parameters, such as forgetting and locality factors, as well as a cross-media similarity measure that combines pseudo-relevance feedback and real relevance feedback. Tools and algorithms are provided which allow the user to judge separately the relevance of the different modes of an object and to interactively switch metrics (monomodal or multimodal metrics) in order to obtain similarity measures that adapt themselves locally to the user's needs.

The apparatus and system aim at addressing these complex needs, with a "multi-strategy," flexible approach. This offers some continuum between pure browsing behavior and query-based search behavior, which unlike conventional methods is not memoryless. The cross-media techniques disclosed herein can combine visual and textual aspects in order to bridge the gap between these two modes when exploring, exploiting, and searching in databases of hybrid (multimodal) objects.

Figure 2:
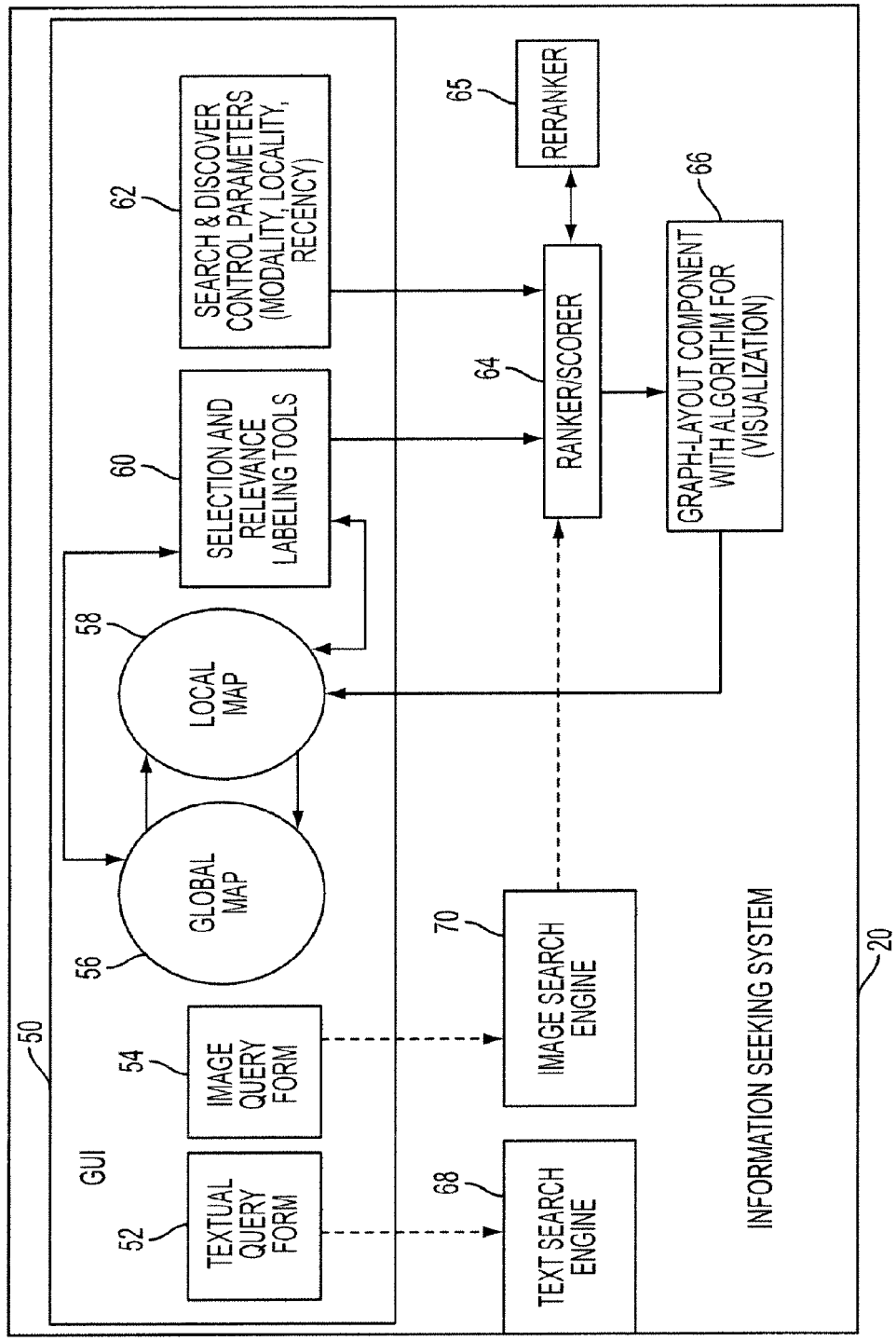
FIG. 2 illustrates a system for interactive searching of a multimedia collection implemented by the apparatus of FIG. 1.

As illustrated in FIG. 1, a multimedia information seeking apparatus is illustrated by way of example. A set of multimedia objects 10, such as exemplary documents 12, 14, 16 are input to the apparatus and are processed to define a multimedia collection 18. As will be appreciated, the collection 18 may include fifty or more and in some cases, hundreds of such objects. The apparatus hosts an information seeking system 20, which causes a global and/or local representation of objects in the collection to be displayed on a display 22, such as a computer monitor or screen. The exemplary system 20, illustrated in greater detail in FIG. 2, is in the form of software stored in main memory 24 of a computing device 26, and is executed by an associated computer processor 28. The processed multimedia collection 18 may be stored in memory 30 of the same or a linked computing device. Components 24, 28, 30 of the computing device 26 are linked to each other by a data/control bus 32. Wired or wireless link(s) 34 (e.g., a local area network (LAN), wide area network (WAN), or the Internet) link the system 20 to the display 22, and to a user input device 36, via an input/output interface 38. User input device 36 can be, for example, a keyboard or touch or writable screen, for inputting text, and/or a cursor control device, such as mouse, trackball, or the like, for communicating user input information and command selections to the processor 28. Computer 26 may be in the form of one or more general purpose computing device(s), e.g., a desktop computer, laptop computer, server, and/or dedicated computing device(s).

Figure 3:
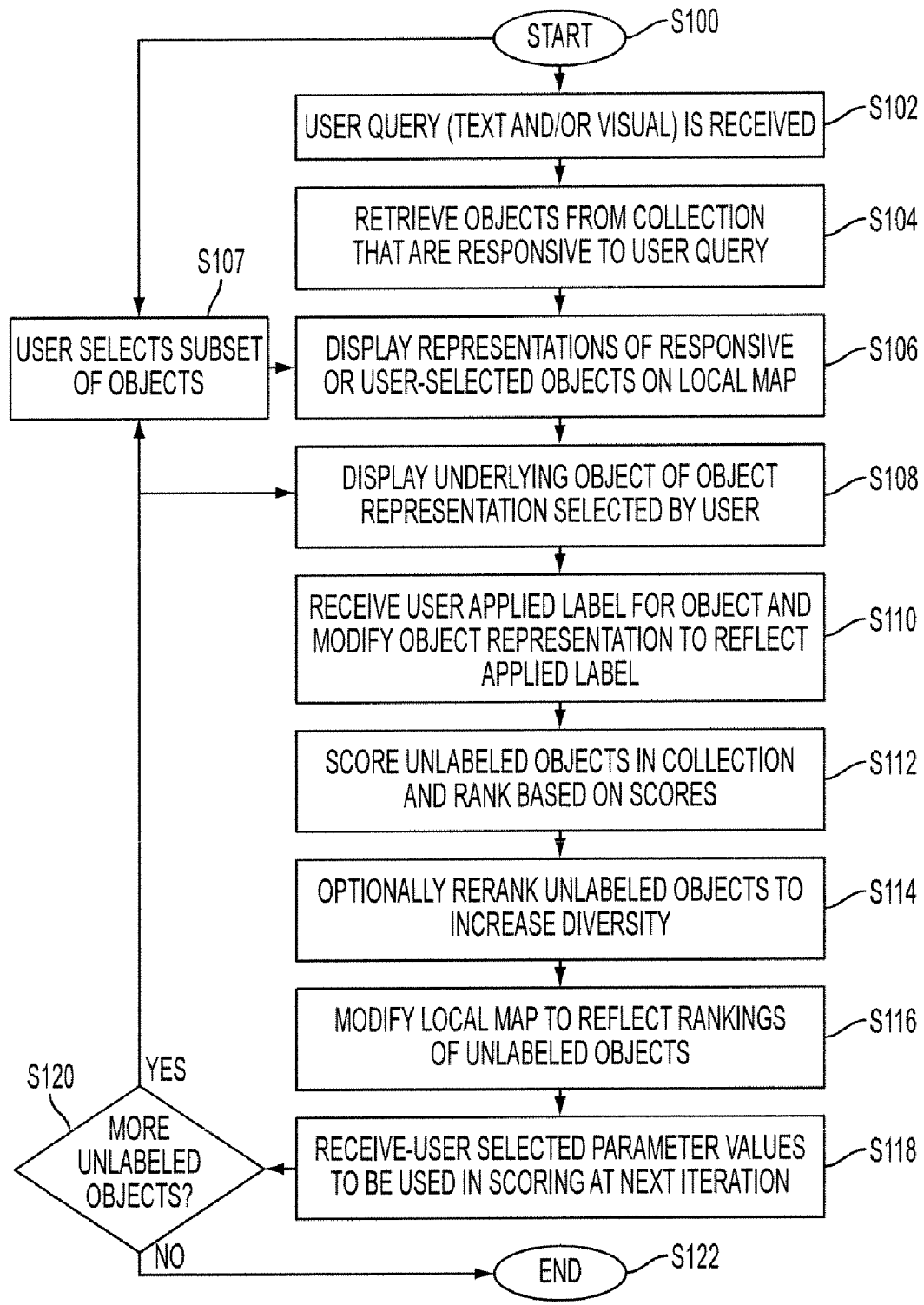
FIG. 3 illustrates a method for interactive searching of a multimedia collection which may be performed with the system and apparatus of FIGS. 1 and 2.

The digital processor 28 executes instructions for performing the method outlined in FIG. 3 and may serve as the computer's CPU. The processor 28 can be variously embodied, such as by a single-core processor, a dual-core processor (or more generally by a multiple-core processor), a digital processor and cooperating math coprocessor, a digital controller, or the like.

The computer memories 24, 30 may represent any type of tangible computer readable medium such as random access memory (RAM), read only memory (ROM), magnetic disk or tape, optical disk, flash memory, or holographic memory. In one embodiment, the memory 24, 30 comprises a combination of random access memory and read only memory. In some embodiments, the processor 28 and main memory 24 may be combined in a single chip.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

It is assumed that the objects 12, 14, 16 forming the collection 18 are processed and similarity measures computed between them, which are stored in memory. In particular, features are extracted from the text and image content of the set of objects 10 forming the processed collection 18. This may be performed with an image feature extractor 40 and a text extractor 42, which extract image features and text features, respectively, from the objects of the multimedia collection. The extracted features may be selected to be discriminative of semantic content and can be used to compute similarity measures between the text and image content of different objects by a similarity measure component 44. Methods for extracting features from text and images and computing similarity measures based thereon are well known and are described, for example, in above-mentioned U.S. application Ser. Nos. 12/233,135 and 12/233,978, incorporated herein by reference in their entireties. As one example, the image features extractor 40 extracts Fisher vectors representative of the images and the text extractor 42 extracts a bag-of-words representation of the text. A monomodal similarity measure indicative of the similarity of image content or text content of two objects can be computed based on the extracted features. This pairwise similarity measure may be precomputed for each object with respect to every other object in the collection for each modality, and stored, e.g., as respective text and image similarity matrices 46, in memory, such as memory 30. In other embodiments, similarity measures may be computed at runtime.

Typically, a multimedia object 12, 14, 16 has related image(s) 48 and text 49 (FIG. 1), both of which relate to the same general subject matter. For example, a multimedia document including an image of a famous person or architectural feature will also include related text, and vice versa. Thus, the exemplary embodiment takes advantage of this in pseudo-relevance cross-modality feedback, described in greater detail below.

FIG. 2 illustrates components of the exemplary system 20, which are described in greater detail below and mentioned only briefly here. In particular, a graphical user interface (GUI) 50 includes several linked components including a textual query form 52, for accepting user input text queries, an image query form 54, for accepting user input image queries, a global map 56, a local map 58, selection and relevance labeling tools 60, for user-selection of an object and applying a label, and search and discover control parameters 62, which are user selectable, such as modality, locality, and forgetting (recency) parameters. Additionally, the system 20 includes a ranker/scorer 64, optionally, a diversity based reranker 65, a graph-layout algorithm 66 for visualization of the global and local maps 56, 58, as well as standard, monomodal text searching and image searching engines 68, 70. These components implement the following functionalities: multi-scale visualization and navigation, flexible multimodal relevance feedback and adaptable search/development metrics.

The components of exemplary system provide some or all of the following features:

1. An architecture and a set of algorithms that couple both serendipitous browsing and query-based search (with relevance feedback) in a flexible and smooth way. This architecture offers a double perspective on the task (global and local), the two views being consistent and linked. This allows the user to navigate better in the database, to understand its underlying structure and boundaries, and to control better the discovery process (exploration of new area vs. local development around some queries or selected objects);

2. A method and a set of tools that allow the user to do a contextual search by introducing parameters such as a forgetting factor (weight of the present interactions with respect to the previous ones in the current session) and a locality factor (weight of some selected objects with respect to other objects already labeled as relevant or non-relevant);

3. A method that defines a cross-media similarity measure that combines pseudo-relevance feedback and real relevance feedback;

4. Tools and algorithms that allow the user to judge separately the relevance of the different modes of an object (the user can label the image part of an object independently of its textual part) and to interactively switch metrics (mono-modal or multimodal metrics) in order to obtain similarity measures that adapt themselves locally to the user needs.

The combination of some or all of these features (algorithms, methods and tools) provides a unique system which facilitates multimodal searching.

FIG. 3 illustrates a computer-implemented method for interactive information seeking which may be performed with the apparatus and system of FIGS. 1 and 2.

The method begins at S100 and assumes the existence of a pre-processed multimodal database 18 and precomputed similarity matrices 46 as described above.

At S102, at iteration t=0 of the session, a user query may be received via the text and/or image query forms 52, 54 of the GUI 50. The query may be a text query, formed by inputting query words, an image-based query, e.g., by inputting an image of the type the user is interested in, or a query which includes both text and image.

At S104, the database may be queried based on the user's query, using the appropriate text search engine 68 for a text query and/or image search engine 70 for an image based query. In particular, a bag-of-words representation of the text query may be generated, or a fisher vector or other features based representation extracted from a query image.

At S106, a group of the objects in the database 18 is retrieved by the search engine 68, 70 as being responsive to the query. Representations 78 of the objects are generated graphically in two dimensions to be displayed in the local map 58 on the display 22 (see, e.g., FIG. 4). The representations may take the form of thumbnails which show a reduced resolution version of all or part of the underlying object, or may be simple tiles of any suitable size and shape. The represented objects in the local map 58 are also highlighted or otherwise identified in the global map 56 (see, e.g., FIG. 5).

As an alternative or in addition to inputting a query, at S107, the user may select a group of represented objects from the global map 56 and, e.g., drag and drop them onto the local map 58. These objects are still represented on the global map as well. Step S107 may take place at any time during the method and may be repeated at one or more of the following iterations. The objects represented on the local map at any one time form a subset (i.e., fewer than all) of the objects in the multimedia collection. The displayed subset may vary over time due to objects being added or removed from the displayed subset.

The following steps S108-S116 are repeated for one or more iterations t=1, 2 . . . n until the user decides to stop labeling objects or there are no more objects in the local map 58 to label.

At S108, the user reviews the local map 58 and selects an object to review, for example, by clicking on one of the object representations 78 in the local map, which opens up the underlying object 12 for inspection.

At S110 the user may decide to label the text content and/or image content of the object 12 using the selection and relevance tools 60. In one embodiment, the user may select between three labels: responsive (+), non responsive (−), and unsure (?), indicating that the user is not yet ready to label that object. Text and image content may be labeled independently, such that, for example, an object 12 may have its text labeled as relevant by the user and its image labeled as non-relevant, or vice versa. The user may also decide not to label the object at all. The user may also assign a locality label to the object, described in detail later. The labels may be in any suitable format which links the information to the object, such as a list, metadata, file header, or the like. In the local and global maps 58, 56, the labeled object representations 78 may be modified, e.g., by a change in color, shape, size, border, or the like, which is indicative of the applied label. The user may chose to label only a single object, or may label two or more objects, at each iteration.

At S112, the remaining unlabeled objects in the collection 18 are scored by the ranker/scorer 64 according to an algorithm which applies a relevance scoring function (an equation) which takes into account the previously applied object labels. As described in further detail below, the relevance scoring function takes into account a number of factors including the search modality selected by the user at the current iteration (e.g., text or image), a forgetting factor, which place more weight on objects which have been labeled in a recent iteration than in a less recent iteration, and a locality factor. The unlabeled objects are ranked, based on their scores.

At S114, a diversity-based re-ranking may be performed by reranker 65.

At S116, the visualization component 66 generates updated local and global maps based on the scores generated at S112 as optionally modified by the reranker at S114. The object representations 78 are arranged in 2D with features such as size, shape, borders, color, proximity, linking lines, and the like to emphasize their user applied labels, relevance score and/or similarity. (In FIG. 4, by way of example, the borders of the labeled objects are shown differently, for ease of illustration).

Figure 4:
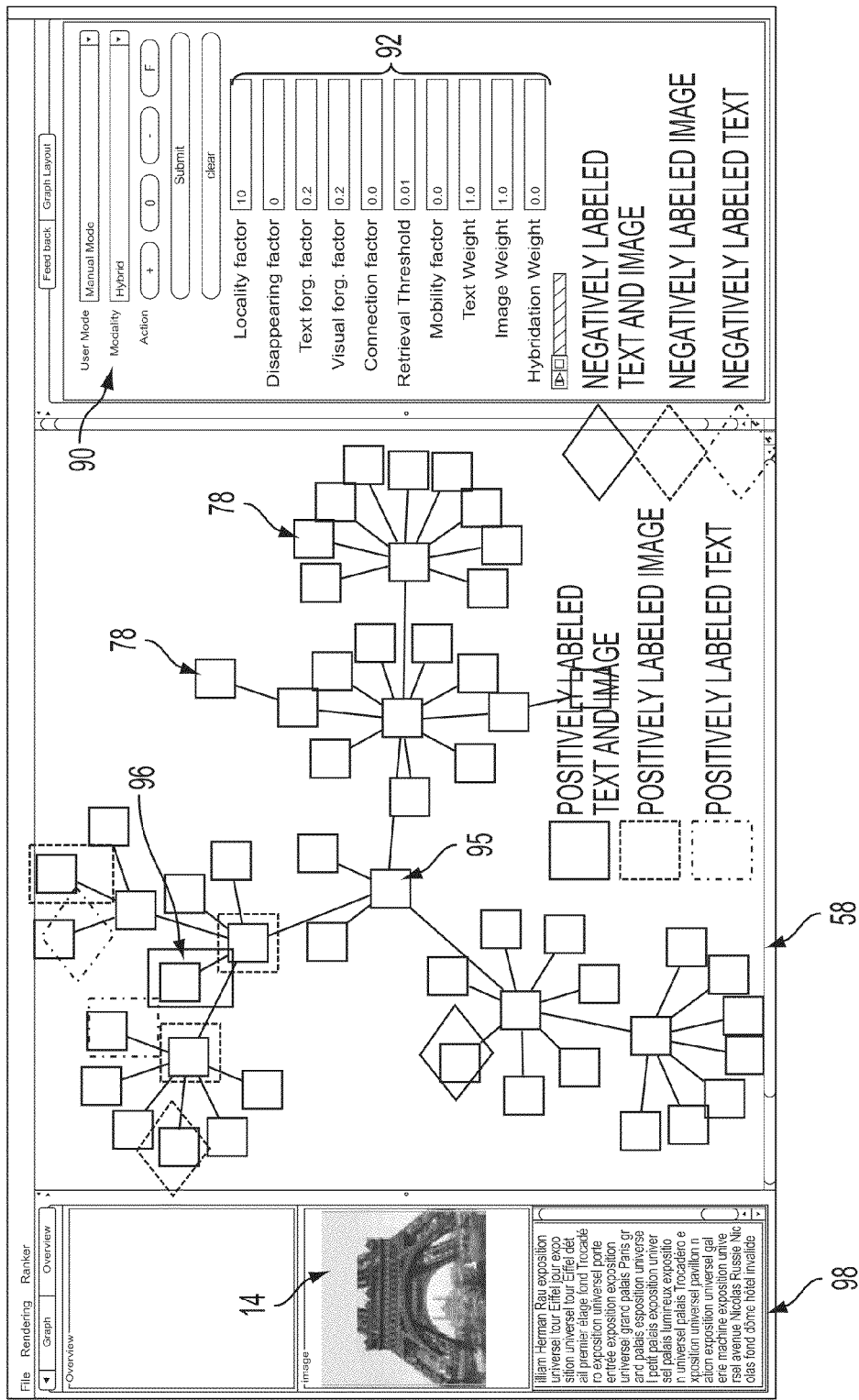
FIG. 4 illustrates a screen shot of a display showing a local map.

At S118, which may occur at any time during the method, the user may decide to set or change one or more control parameters, for the next iteration via selection boxes 92 displayed on the screen (FIG. 4). The selected parameters are factored into the scoring of unlabeled objects. For example, the user may select one or more of: a modality (text, image, or hybrid); text and/or image forgetting factor parameters to modify the weight placed on more recent labels; and a locality factor for a selected object. Some of the parameters may have default values which are set by the system. Some of parameters may be set directly, for example by inputting a numerical value or selecting a value from a drop down box. In other embodiments, a user clicks on a sliding scale or the like which is variable between maximum and minimum permitted settings.

At S120, if there are more unlabelled objects and if the user chooses to continue labeling, the method may proceed to S108 for a further iteration.

The method ends at S122.

The method illustrated in FIG. 3 may be implemented in a computer program product that may be executed on a computer by a computer processor. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the information seeking method.

The exemplary system 20 integrates the following functionalities:

1. Multi-Scale Visualization and Navigation:

The system 20 offers (at least) two levels of visualizing the context of the information seeking task. One is the 2D global map 56 of the whole multimedia corpus, emphasizing the underlying structure of this corpus, from different modal perspectives. The user can switch to purely visual, purely textual, or a hybrid view so that, in fact, three static maps co-exist. The structure is typically characterized by different clusters and sub-clusters, with mutual positions indicating how these clusters relate to each other.

The second, local map 56, synthesizes the history of the current session, by representing all objects the user has to interact with (which may be based on the user's query) on a single 2D map that once again emphasizes the underlying structure of this set of objects (clusters), as well as their mutual similarity relationships. By default, the user does not impose a particular modal perspective, although the user can select to do so via selection box 90. Unless a mode is selected, the system 20 reflects the history of the search by having different metrics depending on the previous interactions in the same session as discussed below. Objects in the local map are linked to their respective counterparts in the global map 56; the latter indicates clearly what is (or what are) the area(s) of the global map 56 that are represented on the local map 58. The global map 56 not only provides the user with a clear context of the current search status, but also with a way to drastically change the search area by favoring exploration rather than exploitation of the current search results. Presenting objects on a map allows the user to perform serendipitous browsing, see G. Marchionini. *Exploring search: From Finding to Understanding, Communications of the ACM,* 49:41-46, 2006, and, consequently, to focus on the recall (and not necessarily the precision) with respect to the user's information need. Having at least two maps (one global, one local) makes it easier for the user to be aware of the boundaries of the user's search, to understand the different landscapes at different scales, and to control better the exploration and exploitation (local development) phases, by switching from one map to the other.

2. Flexible Multimodal Relevance Feedback:

The user can provide qualitative judgments on the different results that the system 20 proposes. The user feedback can be expressed in a flexible way: given a multimodal object, the user can give different judgments to the image part and to the textual part of the same object at S110.

For example, the user can give a positive feedback to the image and a negative feedback to the text (or vice versa). It may be noted that, unlike the previous functionality, relevance feedback aims more at improving the precision of the system. Furthermore, since the user can go back and forth between the global and the local maps, the user can discover relevant (or irrelevant) objects in the former that were not displayed in the latter. For example, the user can drag and drop objects from the global map 56 to the local map 58 that the user may find interesting to label.

3. Adaptable Search/Development Metrics; Aspects Related to Multimodality:

The user can promote different kinds of similarity for searching. The search can rely on textual similarities, visual similarities, or hybrid text and visual similarities. The user can switch this modality at any time during a search session. The 2D local map 58 takes this into account so that, around some nodes 94, the metrics that define local neighbors could be visual, while being textual or hybrid around other nodes 96. The same map 58 can then include different similarity metrics. The objective of this approach is not to lose the user by constantly changing the local map layout from one iteration to the next one. Rather, new objects are added by slightly perturbing the previous layout and using the similarity metrics promoted by the user at the current iteration, while already present objects keep their mutual similarity relations, as a result of all previous interactions.

4. Adaptable Search/Development Metrics; Aspects Related to Locality and Forgetting Factors:

The system aims at providing the user with a continuum between a pure browsing behavior (serendipitous search, guided by similarity links) and a query-based search with relevance feedback. This is done by using a suitable combination of a locality factor and a forgetting factor, that will weight accordingly all the accumulated information in the current session (mainly the initial query at t=0, if it exists, and all proposed objects that the user labeled as relevant or not relevant). More particularly, the locality factor allows some selected objects to have more weight than others, in order to "develop" the similarity graphs locally. The forgetting factor assumes that the user is naturally more prone to give more importance to what the user interacts with recently, rather than what developed initially. Indeed, it is often the case that, at the early stage of the session, the user has only a vague knowledge of what the user is looking for and that the needs become increasingly more precise as the user interacts with the system.

5. Diversity-Based Re-Ranking:

In one embodiment, at each iteration of the session, the system 20 tries to promote diversity when proposing new objects to be judged as relevant or not by the user. This may be based on an implicit clustering (e.g., the MMR (Maximum Marginal Relevance) method or an explicit clustering. Avoiding redundancy is realized by a re-ranking phase, where objects very similar to (or in the same cluster as) objects with better relevance scores, are downgraded.

6. System Architecture

The general system architecture has been described with respect to FIGS. 1 and 2 above. Some aspects of the system 20 are now described in greater detail.

A. The Graphical User Interface:

The GUI 50 includes two standard query interfaces 52, 54 (one for textual query, one for image query) that are typically used at the beginning of the session (iteration t=0), in order to generate an interesting subset of objects for further development as the "zero page" on the local map 58 (with corresponding highlighting on the global map 56). The search engines 68, 70 may be standard ones, typically returning the k nearest neighbors of a given query (textual or visual). The query is therefore considered as a non-static relevant object, which is then integrated in the ranking algorithm as any other static object. Note that the use of query forms is optional as the user can simply select one or more objects of the global to "develop" them in the local map.

The GUI also allows the user to select objects (or sets of objects such as clusters) from both the global and the local maps 56, 58, for further local expansion; to label objects (or sets of objects) as relevant or non-relevant for each mode independently, and to control the search process for the next iteration by setting the modality, locality and forgetting factors that are used by the ranker/scorer component 64. More specifically, given a multimodal item, the user can give different judgments for the visual and textual parts of this object. For example, where color is used to denote relevance, the corresponding negatively labeled part is then color-reversed in the map. After giving feedback, the user will typically promote different kinds of similarity for the next step. The search can rely on textual, visual or hybrid similarities (independently from the modalities of the feedback). The 2D local map takes this into account so that, around some nodes, the metrics that define local neighbors could be visual, while being textual or hybrid around other nodes. Finally, as the system aims at providing the user with a continuum between a pure browsing behavior (serendipitous search, guided by similarity links) and a query-based search with relevance feedback, it allows the user to tune a suitable combination of a locality factor and a forgetting factor, that will weight accordingly all the accumulated information in the current session (mainly the initial query, if it exists, and all proposed objects that the user labeled as relevant or not relevant). More particularly, locality allows some selected objects to have more weight than others, in order to "develop" the similarity graphs locally. The forgetting factor assumes that the user is naturally more prone to give more importance to what the user interacts with recently, rather than what the user developed initially. On the map 56, 58, objects impacted by the forgetting factor are indicated by their fading level (or alternatively, by their decreasing size).

B. The Ranker/Scorer Component 64: Multimodal Relevance Feedback

At each iteration, Ranker/Scorer component 64 generates a ranked list of objects that are considered to have the largest probability of being relevant, given the information accumulated up to that moment (based on relevance feedback labels and potential initial query) and the different search/discovery parameters of the current iteration (local development around some one or more nodes, modality and forgetting factor to be given to objects annotated at previous interactions). This component also accommodates the fusing of the textual and visual modes, when needed. In the exemplary embodiment, this may be partly realized by defining a cross-media similarity measure based on a mix of real and pseudo-relevance feedback.

Table 1 lists parameters which are utilized in the algorithm applied by the ranker/scorer. It is assumed that the user performs several labeling operations t=1, 2 . . . n, on a set of objects, the highest positive value of t corresponding the most recently applied label.

In what follows, the shortcuts "image" and "text" are used to refer respectively to visual part and textual part of some multimedia object.

TABLE 1

| NOTATION | MEANING |
|---|---|
| Y | A labeled object in the collection |
| $S_T$ | Textual similarity matrix- may be stored in memory and include pre-computed similarity measures between all pairs of the text parts of the objects |
| $S_I$ | Image similarity matrix- may be stored in memory and include pre-computed similarity measures between all pairs of the image parts of the objects |
| $mod^t$ | Modality variable (type of similarity chosen by the user at step t); could take 3 values: text (T), Image (I), or Hybrid (H) |
| $\gamma_T^t$ | Weight given to the textual mode according to the modality(ies) chosen by the user |
| $\gamma_I^t$ | Weight given to the visual mode according to the modality(ies) chosen by the user |
| $f^{t+1}(x)$ | Relevance score of a multimedia object x at step t + 1 |
| $T_+^t$ | Set of objects whose textual part has been labeled as relevant by the user up to step t |
| $\alpha_T^t$ | Weight vector given to the objects whose textual part was labeled as positive (relevant) and which depends on t. The weight vector has the effect of decreasing importance of a text part that was annotated at the very beginning of the session. |

TABLE 1-continued

| NOTATION | MEANING |
|---|---|
| | This vector takes into account the locality factor and the forgetting factor at current iteration t |
| $T_-^t$ | Set of objects whose textual part has been labeled as non-relevant by the user up to step t |
| $\beta_T^t$ | Weight vector given to the objects whose textual part was labeled as negative (non-relevant) and which depends on t (through the locality and forgetting factors)-analogous to $\alpha_T^t$ |
| $I_+^t$ | Set of objects whose visual part has been labeled as relevant by the user up to step t |
| $\alpha_I^t$ | Weight vector given to the objects whose visual part was labeled as positive (relevant) and which depends on t |
| $I_-^t$ | Set of objects whose visual part was labeled as non-relevant by the user up to step t |
| $\beta_I^t$ | Weight vector given to the objects whose visual part was labeled as negative (non-relevant) and which depends on t (through the locality and forgetting factors). |
| $\lambda_T$ | Global weight of the (text to image) pseudo-relevance feedback (PRF) component (that implements cross-media similarities) (PRF applied to positive examples) |
| $\delta_T$ | Global weight of the (text to image) pseudo-relevance feedback (PRF) component (that implements cross-media similarities) (PRF applied to negative examples) |
| $\lambda_I$ | Global weight of the (text to image) pseudo-relevance feedback (PRF) component (that implements cross-media similarities) (PRF applied to positive examples) |
| $\delta_I$ | Global weight of the (text to image) pseudo-relevance feedback (PRF) component (that implements cross-media similarities) (PRF applied to negative examples) |
| $T_0^t$ | Set of objects whose textual part has been labeled as neutral by the user up to step t. Typically they are the texts that appear on the local map and which are not labeled as relevant nor irrelevant by the user. |
| $I_0^t$ | Set of objects whose image part has been labeled as neutral by the user up to step t. Typically they are the images that appear on the local map and which are not labeled as relevant nor irrelevant by the user. |
| $A^t$ | Set of all already annotated objects: $T_+^t \cup T_-^t \cup T_0^t \cup I_+^t \cup I_-^t \cup I_0^t$. |
| $K_T(y)$ | Set of nearest neighbors of an object y according to the textual similarity vector $S_T(y,:)$ |
| $K_I(y)$ | Set of nearest neighbors of an object y according to the visual similarity vector $S_I(y,:)$ |
| $B_T^t(y)$ | Set of textual nearest neighbors of object y that have not yet been annotated, $B_T^t(y) = K_T(y) - A^t$, |
| $B_I^t(y)$ | Set of textual nearest neighbors of object y that have not yet been annotated $B_I^t(y) = K_I(y) - A^t$, |
| T | Current iteration number |
| $date_T(y)$ | Iteration number when text of object y was annotated (it is the most recent one, in the case when the user has labeled it more than once. |
| $date_I(y)$ | Iteration number when image of object y was annotated. |
| $forg^t$ | Forgetting factor: $forg^t \in [0.1]$ |
| $S_T^t$ | Set of selected texts (for locality). $S_T^t \subseteq T^t$ |
| $S_I^t$ | Set of selected images (for locality). $S_I^t \subseteq I^t$ |
| $loc^t$ | Locality factor for objects of interest chosen by the user at iteration t, $loc^t \in [0.1]$. |
| $T^t$ | Set of objects whose textual part has been labeled: $T^t = T_+^t \cup T_-^t$ |
| $I^t$ | Set of objects whose visual part has been labeled: $I^t = I_+^t \cup I_-^t$ |
| $D_T^t(y)$ | Given an object y in $T^t$, it is the set of selected texts z that was annotated after y, such that $date_T(z) \geq date_T(y)$. |
| $D_I^t(y)$ | Given an object y in $I^t$, it is the set of selected images z that was annotated after y, such that $date_I(z) \geq date_I(y)$. |

In one embodiment, the ranking algorithm uses similarity matrices and cross-media similarities. Equation 1 provides a basic formula for computing, at each iteration, a new relevance score $f^{t+1}(x)$ for each unlabeled object, of the database, based on the accumulated feedback information and the control parameters the user has chosen for the current iteration t.

$$f^{t+1}(x) = \quad \text{(Eqn. 1)}$$

$$\gamma_T^t \left[ \sum_{y \in T_+^t} \frac{\alpha_T^t(y)}{\sum_{y' \in T_+^t} \alpha_T^t(y')} \left( S_T(y,x) + \lambda_T \frac{\sum_{z \in B_T^t(y)} S_T(y,z) S_I(z,x)}{\sum_{z' \in B_T^t(y)} S_T(y,z')} \right) - \sum_{y \in T_-^t} \frac{\beta_T^t(y)}{\sum_{y' \in T_-^t} \beta_T^t(y')} \left( S_T(y,x) + \delta_T \frac{\sum_{z \in B_T^t(y)} S_T(y,z) S_I(z,x)}{\sum_{z' \in B_T^t(y)} S_T(y,z')} \right) \right] \begin{array}{l} \leftarrow A \\ \leftarrow B \end{array} +$$

$$\gamma_I^t \left[ \sum_{y \in I_+^t} \frac{\alpha_I^t(y)}{\sum_{y' \in I_+^t} \alpha_I^t(y')} \left( S_I(y,x) + \lambda_I \frac{\sum_{z \in B_I^t(y)} S_I(y,z) S_T(z,x)}{\sum_{z' \in B_I^t(y)} S_I(y,z')} \right) - \sum_{y \in I_-^t} \frac{\beta_I^t(y)}{\sum_{y' \in I_-^t} \beta_I^t(y')} \left( S_I(y,x) + \delta_I \frac{\sum_{z \in B_I^t(y)} S_I(y,z) S_T(z,x)}{\sum_{z' \in B_I^t(y)} S_I(y,z')} \right) \right] \begin{array}{l} \leftarrow C \\ \leftarrow D \end{array}$$

Note that Eqn. 1 has four terms which will be referred to as terms A, B, C, and D. Terms A and B, within the bracket preceded by $\gamma_T^t$, relate to the text portion of the objects. Term A considers the positively labeled text parts of each object y. Term B, after the minus sign, considers the negatively labeled text parts of objects y. Terms C and D, within the bracket preceded by $\gamma_I^t$, consider the corresponding positively and negatively labeled image parts of objects y. Within each term A, B, C and D, subparts A1, B1, C1, and D1 considers the similarity matrix value $S_T$ or $S_I$, respectively, between objects y and x, obtained from the respective text or image similarity matrix 46. Subparts A2, B2, C2, and D2, preceded by $\lambda_T$, $\delta_T$, $\lambda_I$, and $\delta_I$, respectively, are pseudo-relevance components which are described in greater detail below.

In Eqn. 1, the scalars $\gamma_T^t$ and $\gamma_I^t$ are weights that reflect the search modality(ies) chosen by the user at the current iteration. More precisely, at each iteration:

$$\gamma_T^t = \begin{cases} 0 & \text{if } \text{mod}^t = I \\ c_T & \text{otherwise} \end{cases} \quad \text{(Eqn. 2)}$$

and $$\gamma_I^t = \begin{cases} 0 & \text{if } \text{mod}^t = T \\ c_I & \text{otherwise} \end{cases} \quad \text{(Eqn. 3)}$$

where $c_T$ and $c_I$ are pre-defined constants. In one embodiment $c_T$ and $c_I$ have values which are greater than 0 and $\leq 1$. Thus, for example, if at the current iteration, the user has selected the text modality, T, then terms C and D of Eqn. 1 are thus multiplied by zero and relevance score $f^{t+1}(x)$ is solely dependent on terms A and B. If, on the other hand, the user selects the hybrid modality H (text and image are to be considered), then $\gamma_T^t$ takes a value $c_T$ and $\gamma_I^t$ takes a value $c_I$.

In Eqn. 1, $\sum_{y' \in T_+^t} \alpha_T^t(y'), \sum_{y' \in T_-^t} \beta_T^t(y'), \sum_{y' \in I_+^t} \alpha_I^t(y'),$ and $\sum_{y' \in I_-^t} \beta_I^t(y')$ are normalizing factors for normalizing the respective weight vectors. Similarly, $$\sum_{z' \in B_T^t(y)} S_T(y, z'), \sum_{z' \in B_T^t(y)} S_T(y, z'),$$

etc. are normalizing factors for the pseudo-relevance components of terms A, B, C and D.

The vectors $a_T^t, a_I^t, \beta_T^t, \beta_I^t$ are weights that give the importance of (positively or negatively) annotated texts or images at a given iteration in order to compute the new relevance scores. These weights take into account different parameters, as follows:

First, the user can select a subset of the current annotated items. These selected objects are defined $S_T^t$ and $S_I^t$, which correspond to the nodes of the graph around which the system 20 should develop new elements. These elements are given an extra weight $loc^t$ compared to other labeled objects.

Second, the user can explicitly assign the importance to be given to previously annotated data. This is the forgetting factor ($forg^t$). With such a factor, it is assumed that the weight of an annotated item will decrease with time. Thus, the older the annotation given to an element, the lower the weight of the latter. The user (or the system, through default settings) can control this parameter and choose to give different kinds of weights' distribution.

The "recentness" (or oldness) of the labeling can be modified based on the user's past behavior. Suppose that the current iteration is t. Assume that the user decides to go back to the results provided at iteration t'<t and selects some objects of iteration t'. This may mean that the user wants to pursue another direction in information seeking. Therefore, it is assumed that the texts and images that were annotated from step t'+1 up to t−1 are no longer important. Hence, a null weight may be given to these objects.

According to the notations given in Table 1, the weight vectors for the annotated texts are computed as follows. In one embodiment, $\beta_T^t(y) = \alpha_T^t(y)$ (which has been found to work well in practice), although in other embodiments, these weights may be computed differently. Then, for example, $$\forall y \in T^t: \quad \text{(Eqn. 4)}$$

$$\alpha_T^t(y) = \begin{cases} \dfrac{1}{1 - loc^t} & \text{if } y \in S_T^t \\ (forg^t)^{m_T(y)} & \text{if } y \notin S_T^t \text{ and } m_T(y) \geq 0 \\ 0 & \text{if } y \notin S_T^t \text{ and } m_T(y) = -1 \end{cases}$$

where: (Eqn. 5)

$$m_T(y) = \begin{cases} t - date_T(y) & \text{if } S_T^t = \varnothing \\ \min_{z \in D_T^t(y)} (date_T(z) - date_T(y)) & \text{if } D_T^t(y) \neq \varnothing \\ -1 & \text{if } D_T^t(y) = \varnothing \end{cases}$$

where $D_T^t(y) = \{z \in S_T^t: date_T(z) \geq date_T(y)\}$ and $\varnothing$ represents an empty set.

The second condition of $m_T(y)$ takes care of the case where a user has decided to go back to a prior iteration and select an object for labeling from that iteration.

In one embodiment, the locality factor $loc^t$ can vary between 0 and 1. It can be seen that a locality factor $loc^t$ equal to 0 amounts to giving no extra weight to selected objects (in this case, it does not make sense to select any object). On the contrary, a locality factor equal to 1 will result in discarding all the non-selected items. Indeed, when this factor tends to 1, the only non-null contributions in the different terms of Eqn. (1) come from the selected objects, due to the weighted average effect. In one embodiment, the system 20 automatically assigns a default locality factor $0 </loc^t < 1$ to all objects that the user identifies as being selected objects.

Similarly, for the image part, the equations below may be applied. Once again, it may be assumed that $\beta_I^t(y) = \alpha_I^t(y)$, $$\forall y \in I^t: \quad \text{(Eqn. 6)}$$

$$\alpha_I^t(y) = \begin{cases} \dfrac{1}{1 - loc^t} & \text{if } y \in S_I^t \\ (forg^t)^{m_I(y)} & \text{if } y \notin S_I^t \text{ and } m_I(y) \geq 0 \\ 0 & \text{if } y \notin S_I^t \text{ and } m_I(y) = -1 \end{cases}$$

where: (Eqn. 7)

$$m_I(y) = \begin{cases} t - date_I(y) & \text{if } S_I^t = \varnothing \\ \min_{z \in D_I^t(y)} (date_I(z) - date_I(y)) & \text{if } D_I^t(y) \neq \varnothing \\ -1 & \text{if } D_I^t(y) = \varnothing \end{cases}$$

where $D_I^t(y) = \{z \in S_I^t: date_I(z) \geq date_I(y)\}$.

Negative and positive pseudo-relevance feedback is respectively introduced through the terms A2, B2, C2 and D2, which are weighted by $\delta_T, \delta_I$ and $\lambda_T, \lambda_I$, respectively, in Eqn. (1). The pseudo-relevance terms assume that text and image of an object are more likely to have a similar relevance. To be more precise, it is a trans-media pseudo-relevance feedback, which considers as relevant, the textual part of images z that are very similar to the images fed back as relevant by the user. However, this feedback mechanism discounts a pseudo-relevant object by the factors $\lambda_T$ or $\lambda_I$ and by the specific (normalized) visual similarity between the pseudo-relevant object and the corresponding neighboring labeled objects. Similarly, the system 20 considers as irrelevant, the textual part of images that are very similar to the images fed back as non-relevant by the user, the feedback mechanism discounts such pseudo-relevant object by the general $\delta_T$ or $\delta_I$ factors and by the specific (normalized) similarity between this pseudo-relevant object and the corresponding labeled neighboring objects. To be consistent, neighbors of labeled objects that are themselves labeled are never considered as pseudo-relevant objects.

C. The Diversity-Based Re-Ranker 65

The Ranker/Scorer 64 outputs are optionally post-processed by the diversity-based re-ranker 65 whose role is to avoid redundancy in what will be proposed to the user at the next iteration and to favor quick local exploration. This component can be intimately coupled with the graph-layout component 66 by basing its decision on the cluster structure revealed by the graph-layout component (this ensures consistency between both modules). In one embodiment, component 65 may be disabled after a sufficient number of iterations if the user's objective is to get as many relevant objects as possible (focusing on recall), rather than quickly identifying one single object that fits the user's information needs. The re-ranker 65 may employ an algorithm based on an implicit clustering (e.g., the MMR—Maximum Marginal Relevance—method) or an explicit clustering. Avoiding redundancy is realized by a re-ranking phase (S114), where objects very similar to (or in the same cluster as) objects with better relevance scores, are downgraded. The diversity-based re-ranker may be configured similar to that described in J. Ah-Pine, C. Cifarelli, S. Clinchant, G. Csurka, and J. Renders.

*XRCE's Participation to ImageCLEF* 2008, *In Working Notes of CLEF '08 Workshop.* 2008. Clustering methods and re-ranking strategies (explicit clustering and implicit clustering based on the maximal marginal relevance paradigm) are discussed in that reference.

D. The Graph-Layout Component 66

For the global map 56, a sequence of several force directed layout algorithms may be applied to generate the different views of the global map. The final stage may use the LinLog energy model. (See A. Noack, Visual "Clustering of Graphs with Non-Uniform Degrees," in *Proc. Int. Symp. on Graph Drawing* (GD'05), pages 309-320. Springer-Verlag, 2005). The component 66 includes threshold similarity matrices, which may have a user-adjustable threshold. A standard agglomerative hierarchical clustering algorithm is then applied to identify clusters in the 2D space. Cluster naming techniques allow extraction of the most discriminative, representative keywords of each cluster.

The local map layout is a dynamic process. Results are added on the map at each "interactive query" performed by the user. Regarding dynamic representations, one additional constraint may be applied which considers the problem of preserving of the user's mental map (See, e.g., K. Misue, P. Eades, W. Lai, and K. Sugiyama, Layout Adjustment and the Mental Map, *J. Visual Languages & Computing*, 6:183-210, 1995). The objective is not to lose the user by constantly changing the map layout from one iteration to the next one. Thus, in one embodiment, new objects are added by slightly perturbing the previous layout and using the similarity metrics promoted by the user at the current iteration, while already present objects keep their mutual similarity relations, as a result of all previous interactions. This is realized by increasing the inertia of existing nodes and by using the Fruchterman-Rheingold layout algorithm (See, e.g., T. M. J. Fruchterman and E. M. Reingold, "Graph Drawing by Force-Directed Placement," *Softw., Pract. Exper.*, 21:1129-1164, 1991) or other algorithm of this kind.

Optionally, a clustering algorithm is also applied in the 2D local map 56, in order to avoid redundancy in what will be proposed to the user at the next iteration and to favor quick local exploration. In this embodiment, only the most relevant objects of each cluster are displayed on the local map (see, for example, J. Ah-Pine, C. Cifarelli, S. Clinchant, G. Csurka, and J. Renders, "XRCE's Participation to ImageCLEF 2008," in *Working Notes of CLEF'08 Workshop*, 2008). This could be considered as an indirect way of realizing diversity-based re-ranking and can be particularly valuable during the early stages of the process.

Figure 5:
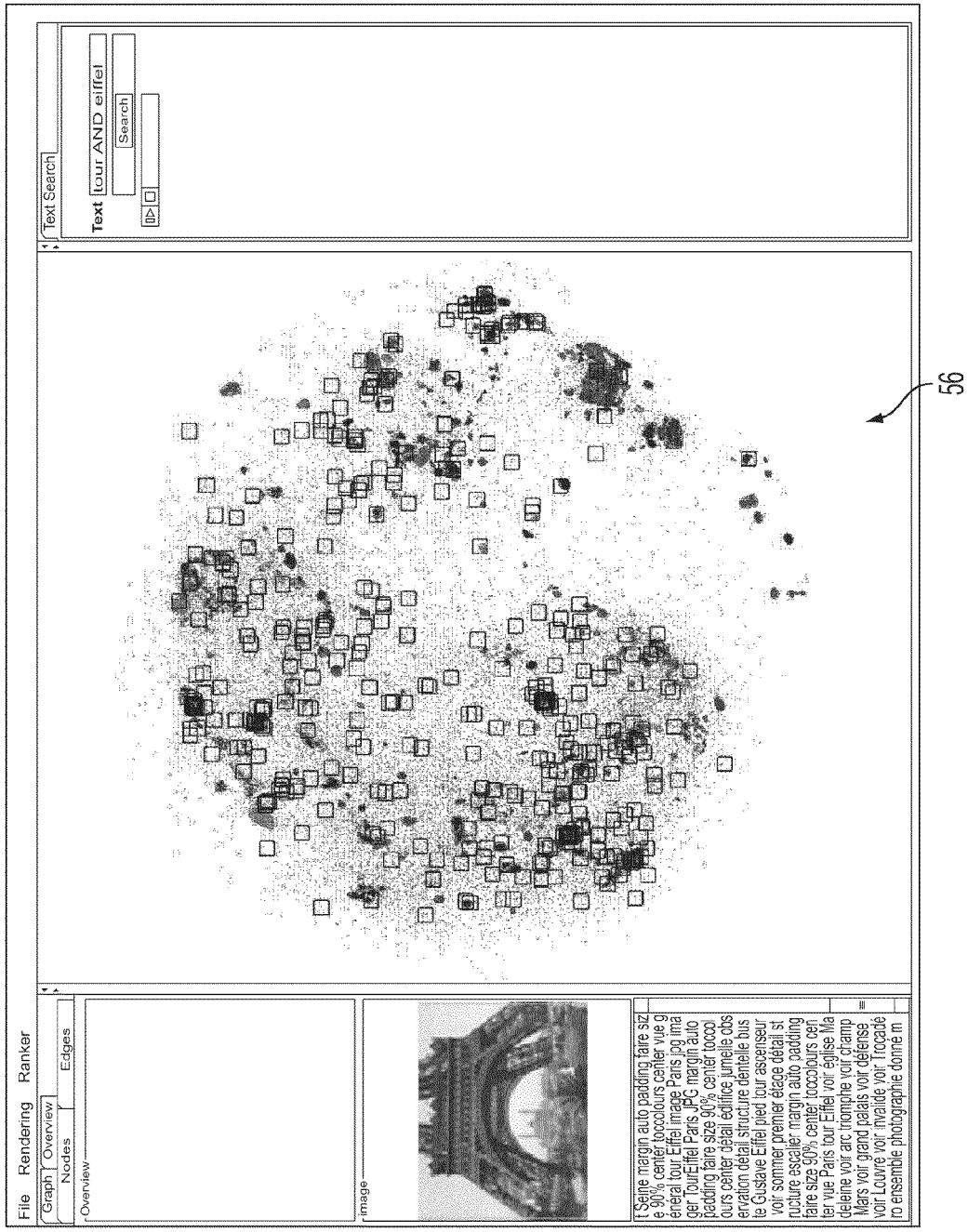
FIG. 5 illustrates a screen shot of a display showing a global map.

By way of example, FIGS. 4 and 5 illustrate local and global maps 58, 56 of a collection of objects which include, within the global collection 18, objects relating to the Eiffel Tower dating back to the beginning of the $20^{th}$ Century. Suppose that a user is interested in old pictures of the Eiffel Tower and wishes to retrieve as broad a range of information as possible. The user may start by looking at the global map, however, may find it more efficient to start by entering a query by typing "Eiffel+tower" in the textual query form 52. The text search engine 68 retrieves a subset of objects 14, 16, etc. which include, within the text component 49, the words Eiffel and Tower (or semantically acceptable equivalents thereof). The responsive objects are highlighted in the global map 56 (FIG. 5). Representations 78, such as thumbnails, of the retrieved objects are displayed in the local map 58. The user may click on one of the objects represented. The underlying object 14 is then displayed on the screen, e.g., beside the local map at 98 (FIG. 4).

Suppose that the user finds that although the text includes information about the Eiffel tower that he is interested in, the image is one of the designer, Gustave Eiffel. He decides to label the text portion as relevant and the image portion as non relevant. He also decides to select the image modality via the modality selector 90, to see if there are other images of the Eiffel tower. At any time, the user may also select scoring parameters via the respective parameter selectors 92. The ranker/scorer component 64 then scores the unlabeled objects in the collection based on the labels applied to the object(s) the user has reviewed and the similarity measures retrieved from the similarity matrices. If he has selected the image modality as a parameter, the ranker/scorer component 64 places greater weight on finding similar images, and the modified local map places greater emphasis on these. The system 20 may also retrieve additional objects from the collection containing similar images to the labeled object which were not originally on the local map, for example, because they did not include the words Eiffel and Tower in any text portion of the object. The system may add these new objects to the local map.

The user may go through several iterations, labeling new objects and at each iteration, the ranking component recomputes the scores/ranking of the unlabeled objects and the local map is modified accordingly. After the user has labeled a few of the objects, he may decide than one of the objects provides a particularly good image of the Eiffel Tower and give it an image locality label, which causes the system to use this as a node 96, around which a cluster of the most similar images. The user may review some of the images in the cluster and label them. Objects which are labeled as not relevant, with respect to both the image and text may be dropped from the local map 58 at the next modification. The user may later switch to the text modality and find an object which describes the construction of the Eiffel Tower in an informative way and label this object with a text locality label. The system 20 then generates a cluster using this object as a new node, around which objects with similar text are arranged. The original cluster of labeled objects, around the node 96, remain unperturbed. Eventually, the user may store some of the most interesting objects in a separate memory location for later review and/or printing.

In the example scenario, on reviewing the global map, the user may observe that a large proportion of the highlighted objects are surrounded by non-highlighted objects and their distribution is spread all over the global map. After a quick observation of some of the highlighted objects, the user may infer that many of the highlighted objects are not relevant for the specific task. The reason is that the Eiffel Tower is often used as a generic French emblem. After zooming in on the global map to review particular areas presenting a high density of highlighted results, the user picks an object whose image represents the Eiffel Tower. Even if not completely relevant to the search subtask (it may be a black and white drawing instead of a photograph, as shown at 95 in FIG. 4). From this chosen element, the user starts a local deployment with the "hybrid modality". The user sets the forgetting factor to 0.2. After 8 iterations during which 12 objects are labeled relevant and 20 irrelevant, the user obtains the results shown in FIG. 4. During this sequence, the user uses the locality feature that allows deeper focus on a set of selected objects. During the iterations, the user may explore different regions of the global map, until a branch of the global map in the upper left part of the map is selected, as it appears to be more related to historical events with a certain relationship with the Eiffel Tower: postcards from the 1900 universal exhibition, portrait of an engineer, etc. Among the objects that constituted this branch, the user finally finds what she is looking for: two pictures of the monument with a blue and white sky on the upper left, which correspond to pictures of the Eiffel Tower dating from the beginning of the 20th century. The effect of the forgetting factor was effective since the strong visual contribution of the first drawing (the item around which the user originally chose for local deployment) was progressively lowered iteration after iteration. Using one global map and one local map jointly allows the user to control better the exploitation/exploration trade-off. The local map allows the user to express the information need more precisely while the global map allows the user to understand better the different boundaries of the search and discover unexpected subtopics.

While using the local map, the user can progressively express the desired information need by selecting relevant texts and/or images and discarding negative examples, in a flexible manner. In the case of the present multimodal feedback technique, this flexibility provides efficient ways to achieve interesting results since the user is really free to associate relevant texts with relevant images that best correspond to her multimodal information need. The locality factor allows a continuum between browse-based and query-based search since the user can discover many subtopics related to a broader topic and focus on some of them at any time of a session. The forgetting factor also allows achievement of this continuum as it models the fact that the user is more aware of her last annotations rather than her first ones. Furthermore, the forgetting factor allows the user to decrease the importance of texts and images with different rates, which is particularly useful in the example scenario.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for information seeking in a multimedia collection of objects comprising:
   through a graphical user interface, receiving at least one of an input text query and an input image query;
   providing for a user to select a subset of objects from a multimedia collection, at least some of the objects in the collection comprising first and second modalities, wherein the first and second modalities comprise a text modality and an image modality;
   displaying representations of objects in the subset on a local map;
   at each of a plurality of iterations:
      providing for the user to annotate the text and image modalities of an object represented in the local map with a relevance label, wherein an object's text modality and image modality are labeled independently;
      automatically assigning a default forgetting factor for at least one of the first and second modalities, or providing for the user to select the forgetting factor for the at least one of the first and second modalities;
      automatically assigning a default locality factor for at least one annotated object, or providing for the user to select a locality factor for the at least one annotated object;
      with a computer processor, computing relevance scores for unlabeled objects in the collection, each relevance score taking into account labels applied to other objects, computed similarity measures between one of the unlabeled objects and the other objects in the collection, the locality factor selected by the user or the default locality factor, and the forgetting factor selected by the user or the default forgetting factor, the forgetting factor placing a greater weight on objects labeled in a more recent iteration;
      modifying the local map based on the computed relevance scores; and
      displaying the modified local map on a visual display.

2. The method of claim 1, wherein the providing for the user to select a subset of objects from a multimedia collection includes providing for the user to drag one or more objects from a global map into the local map on the graphical user interface, the global map displaying all the objects in the multimedia collection.

3. The method of claim 1, further comprising displaying representations of objects in the subset on a global map on the graphical user interface differently from objects in the multimedia collection that are not part of the subset of objects.

4. The method of claim 1, wherein the labels with which the object modalities are annotated are selected from relevant, non-relevant, and an unsure label.

5. The method of claim 1, wherein the relevance scores for unlabeled objects in the collection take into account:
   trans-modality pseudo-relevance terms which consider as relevant, a first modality of an object which has a high computed similarity to another object whose second modality has been labeled as relevant by the user, and vice versa; and
   trans-modality pseudo-relevance terms which consider as irrelevant, a first modality of an object which has a high computed similarity to another object whose second modality has been labeled as irrelevant by the user, and vice versa.

6. The method of claim 1, wherein when the user selects a locality factor for an annotated object, the method further comprises automatically selecting one or more of the annotated objects with a locality factor to form nodes in the local map, and wherein the relevance scores take into account whether a labeled object has been assigned a locality factor.

7. The method of claim 1, wherein the method includes providing for the user to select at least one of the first and second modalities and wherein when the user selects one of the first and second modalities, the computed relevance score takes into account the user-selected at least one of the first and second modalities in computing the relevance scores for at least some of the unlabeled objects.

8. The method of claim 1, wherein the method includes providing for the user to select a forgetting factor for at least one of the first and second modalities and wherein when the user selects the forgetting factor for at least one of the first and second modalities, the computed relevance score takes into account the at least one user-selected forgetting factor in computing the relevance scores for at least some of the unlabeled objects.

9. The method of claim 8, wherein the method includes providing for the user to select a first forgetting factor for the first modality and a second forgetting factor for the second modality and wherein when the user selects the first and second forgetting factors, the computed relevance score takes into account at least one of the user-selected first and second forgetting factors in computing the relevance scores for at least some of the unlabeled objects.

10. The method of claim 1, wherein where a first condition is met, a weight vector applied in computing the score for unlabeled objects takes into account the at least one user selected forgetting factor to give a greater weight to a more recently labeled object modality than to a less recently labeled object modality.

11. The method of claim 10, wherein where a second condition is met, the weight vector applied in computing the score for unlabeled objects takes into account that the user has returned to results of a prior iteration.

12. The method of claim 11, wherein where a third condition is met, the weight vector applied in computing the score for unlabeled objects takes into account that the user has selected an object to serve as a node in the local map.

13. The method of claim 1, further comprising reranking unlabeled objects in the collection for which scores have been computed to increase diversity in the subset of objects displayed in the local map.

14. The method of claim 1, wherein, in the local map, the labeled objects are displayed differently depending on applied positive and negative labels for each of the modalities.

15. The method of claim 1, wherein the relevance scores for unlabeled objects in the collection are computed with an equation which includes:
- a first term which takes into account relevance feedback and pseudo-relevance feedback of positively labeled text portions of other objects;
- a second term which takes into account relevance feedback and pseudo-relevance feedback of negatively labeled text portions of other objects;
- a third term which takes into account relevance feedback and pseudo-relevance feedback of positively labeled image portions of other objects; and
- a fourth term which takes into account relevance feedback and pseudo-relevance feedback of negatively labeled image portions of other objects.

16. The method of claim 15, wherein in the equation, each term includes a respective normalized weight vector $\alpha_T^t$, $\beta_T^t$, $\alpha_I^t$, $\beta_I^t$, which, under one condition, is a function of the forgetting factor.

17. The method of claim 15, wherein the equation further includes at least one of:
- a weight applied to the first and second terms according to at least one modality selected by the user; and
- a weight applied to the third and fourth terms according to at least one modality selected by the user.

18. A non-transitory computer-readable storage medium encoding instructions, which when executed on a computer causes the computer to perform the method of claim 1.

19. An apparatus comprising:
a graphical user interface;
memory which stores instructions for:
 receiving at least one of an input text query and an input image query through the graphical user interface;
 providing for a user to select a subset of objects from a multimedia collection, at least some of the objects in the collection comprising first and second modalities, wherein the first and second modalities comprise a text modality and an image modality;
 displaying representations of objects in the subset on a local map;
 at each of a plurality of iterations:
  providing for the user to annotate the text and image modalities of an object represented in the local map with a relevance label, wherein an object's text modality and image modality are labeled independently;
  automatically assigning a default forgetting factor for at least one of the first and second modalities, or providing for the user to select the forgetting factor for the at least one of the first and second modalities;
  automatically assigning a default locality factor for at least one annotated object, or providing for the user to select a locality factor for the at least one annotated object;
  computing relevance scores for unlabeled objects in the collection, each relevance score taking into account labels applied to other objects, computed similarity measures between one of the unlabeled objects and the other objects in the collection, the locality factor selected by the user or the default locality factor, and the forgetting factor selected by the user or the default forgetting factor, the forgetting factor placing a greater weight on objects labeled in a more recent iteration;
  modifying the local map based on the computed relevance scores; and
  displaying the modified local map on a visual display; and
a processor in communication with the memory for executing the instructions.

20. The apparatus of claim 19, further comprising:
memory which stores a multimedia collection of objects, at least some of the objects in the collection comprising first and second modalities, and stores similarity matrices for the objects in the collection for each of the first and second modalities;
the graphical user interface, which is configured to display a global map and the local map of objects in the multimedia collection, the local map including representations of a subset of the objects in the multimedia collection, the graphical user interface configured to input parameters for relevance scoring selected from a modality parameter, a locality parameter, and the forgetting factor parameter, and inputting relevance labels for objects, whereby an object's first modality and second modality are able to be labeled independently; and
the instructions comprising:
 a ranking component which computes the relevance scores for unlabeled objects in the collection based on labels applied to other objects, the selected parameters, the similarity matrices; and
 a graph layout component for modifying the local map based on the computed relevance scores.

21. The apparatus of claim 20, wherein the ranking component and graph layout component include instructions stored in memory which are executed by an associated computer processor, the apparatus further comprising a text search engine and an image search engine for selectively querying the collection based on an input user query.

22. The apparatus of claim 20, further comprising a reranking component which reranks scored unlabeled objects to increase diversity of objects displayed in the local map, the a graph layout component modifying the local map based on the computed relevance scores are modified by the reranking component.

23. The apparatus of claim 20, wherein the first modality is a text modality and the second modality is an image modality and wherein the ranking component computes relevance scores with an equation which includes:
 a first term which takes into account relevance feedback and pseudo-relevance feedback of positively labeled text portions of other objects;

a second term which takes into account relevance feedback and pseudo-relevance feedback of negatively labeled text portions of other objects;
a third term which takes into account relevance feedback and pseudo-relevance feedback of positively labeled image portions of other objects; and
a fourth term which takes into account relevance feedback and pseudo-relevance feedback of negatively labeled image portions of other objects.

24. The method of claim 23, wherein the equation further includes at least one of:
a weight applied to the first and second terms according to at least one of text and image modalities selected by the user; and
a weight applied to the third and fourth terms according to at least one of text and image modalities selected by the user.

25. The method of claim 1, further comprising:
storing the multimedia collection of objects in computer-readable memory;
storing similarity matrices for text portions and image portions of the objects in the collection in computer-readable memory;
receiving an input user query selected from a text query, an image query, and a combination thereof;
retrieving a subset of the objects in the collection, based on the user query, and displaying representations of the retrieved objects in the subset in the two-dimensional local map on a display;
providing access to an underlying object of a user-selected object representation displayed in the local map;
providing for the user to label at least one of the text part and the image part of the selected object with a relevance label, whereby the image part and text part of a multimedia object are able to be independently labeled with different relevance labels;
wherein in the computing relevance scores for unlabeled objects in the collection, each relevance score is a function of the user-applied relevance labels to other objects in the collection and respective similarity measures retrieved from the similarity matrices;
reranking the relevance scores to increase diversity; and
modifying the local map based on the reranked relevance scores.

* * * * *